US 9,053,170 B2

(12) United States Patent
Chu et al.

(10) Patent No.: US 9,053,170 B2
(45) Date of Patent: *Jun. 9, 2015

(54) RELATIONSHIP DISCOVERY IN BUSINESS ANALYTICS

(71) Applicant: International Business Machines Corporation, Armonk, NY (US)

(72) Inventors: Yea J. Chu, Chicago, IL (US); Sier Han, Xi'an (CN); Jing-Yun Shyr, Naperville, IL (US); Damir Spisic, Chicago, IL (US); Xueying Zhang, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/791,613

(22) Filed: Mar. 8, 2013

(65) Prior Publication Data

US 2014/0032611 A1 Jan. 30, 2014

Related U.S. Application Data

(63) Continuation of application No. 13/562,201, filed on Jul. 30, 2012.

(51) Int. Cl.
*G06F 17/30* (2006.01)
(52) U.S. Cl.
CPC .... *G06F 17/30598* (2013.01); *G06F 17/30592* (2013.01)

(58) Field of Classification Search
CPC ............... G06F 17/30592; G06F 17/30333; G06F 17/30598; G06F 17/30705
USPC .................................................. 707/737, 957
See application file for complete search history.

(56) References Cited

U.S. PATENT DOCUMENTS

| | | | | |
|---|---|---|---|---|
| 5,940,818 | A * | 8/1999 | Malloy et al. | 1/1 |
| 6,094,651 | A * | 7/2000 | Agrawal et al. | 1/1 |
| 6,317,517 | B1 * | 11/2001 | Lu | 382/228 |
| 6,473,080 | B1 | 10/2002 | Brown et al. | |
| 6,691,140 | B1 * | 2/2004 | Bogrett | 1/1 |
| 6,829,621 | B2 * | 12/2004 | Keller | 707/812 |

(Continued)

FOREIGN PATENT DOCUMENTS

| | | | | |
|---|---|---|---|---|
| EP | 1195694 | * | 4/2002 | G06F 17/30 |
| EP | 1195694 A2 * | | 4/2002 | G06F 17/30 |
| WO | 2011086171 | | 7/2011 | |

OTHER PUBLICATIONS

Herbert W. Marsh, "Goodness-of-fit Indeses in Confirmatory Factor Analysis: The effect of sample size", 2006, pp. 391-409.*

(Continued)

*Primary Examiner* — Pierre Vital
*Assistant Examiner* — Nargis Sultana
(74) *Attorney, Agent, or Firm* — Janaki K. Davda; Konrad, Raynes, Davda and Victor LLP

(57) ABSTRACT

A subset of (k−1)-dimensional tables are received, wherein k is greater than 1. A set of k-dimensional tables is created by combining each of the (k−1)-dimensional tables with a non-included dimension corresponding to a 1-dimensional table. Significance of interaction and interaction effect size is computed for the created set of k-dimensional tables to determine dimension and measure interactions.

8 Claims, 25 Drawing Sheets

(56) References Cited

U.S. PATENT DOCUMENTS

| | | | |
|---|---|---|---|
| 7,194,465 | B1 | 3/2007 | MacGregor |
| 7,509,314 | B2 | 3/2009 | Hamaguchi |
| 7,676,468 | B2 | 3/2010 | Macgregor |
| 7,765,211 | B2* | 7/2010 | Bhattacharjee et al. ...... 707/737 |
| 7,958,063 | B2 | 6/2011 | Long et al. |
| 8,046,174 | B2 | 10/2011 | Li |
| 8,583,686 | B2 | 11/2013 | McGregor |
| 2002/0091707 | A1* | 7/2002 | Keller ................. 707/104.1 |
| 2004/0193633 | A1* | 9/2004 | Petculescu et al. ........... 707/101 |
| 2004/0220972 | A1* | 11/2004 | Bhattacharjee et al. ...... 707/200 |
| 2006/0116975 | A1* | 6/2006 | Gould et al. ...................... 707/1 |
| 2007/0061287 | A1* | 3/2007 | Le et al. ............................ 707/2 |
| 2008/0228767 | A1* | 9/2008 | Kenedy et al. ................... 707/6 |
| 2008/0235192 | A1* | 9/2008 | Kanaya ............................. 707/3 |
| 2009/0006156 | A1* | 1/2009 | Hunt et al. ........................ 705/7 |
| 2009/0018996 | A1* | 1/2009 | Hunt et al. ........................ 707/2 |
| 2009/0228430 | A1* | 9/2009 | Berger et al. .................... 707/2 |
| 2010/0211539 | A1* | 8/2010 | Ho ................................. 707/602 |
| 2010/0250712 | A1 | 9/2010 | Ellison et al. |
| 2011/0246574 | A1* | 10/2011 | Lento et al. .................. 709/204 |
| 2011/0264649 | A1* | 10/2011 | Hsiao et al. .................. 707/722 |
| 2011/0269154 | A1 | 11/2011 | Fantl et al. |
| 2012/0023101 | A1 | 1/2012 | Heimendinger et al. |
| 2012/0066204 | A1* | 3/2012 | Ball et al. ..................... 707/713 |
| 2012/0117064 | A1* | 5/2012 | Draese et al. ................. 707/737 |
| 2012/0313949 | A1 | 12/2012 | Rope et al. |
| 2013/0159307 | A1* | 6/2013 | Wolge et al. ................. 707/737 |
| 2013/0173173 | A1 | 7/2013 | Sane et al. |

OTHER PUBLICATIONS

Bi, J., K.P. Bennett, M. Embrechts, C.M. Breneman, and M. Song, "Dimensionality Reduction via Sparse Support Vector Machines" Journal of Machine Learning Research 3 (2003) 1229-1243, Total 15 pp.

Elizalde, F., E. Sugar, A. Reyes, and P. Debuen, "An MDP Approach for Explanation Generation", In: Workshop on Explanation-Aware Computing with AAAI, (2007), Total 6 pp.

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

Mell, P. and T. Grance, "The NIST Definition of Cloud Computing (Draft)", Jan. 2011, Computer Security Division Information Technology Laboratory National Institute of Standards and Technology, Total 7 pp.

Moore, A.W., "The Anchors Hierarchy: Using the Triangle Inequality to Survive High Dimensional Data", Proceedings of the 16th Conference in Uncertainty in Artificial Intelligence, San Francisco, 2000, Total 9 pp.

Shank, "Determinants of Consulting Service Quality for Accounting and Nonaccounting Service Providers", [online], retrieved from the Internet at <URL: http://www.allbusiness.com/accounting/190825-1.html>, Journal of Information Systems, Mar. 22, 2002, Total 21 pp.

Ting, J., A. D'Souza, S. Vijayakumar, and S. Schaal, "Efficient Learning and Feature Selection in High-Dimensional Regression", Neural Computation vol. 22, pp. 831-886, 2010, Total 56 pp.

U.S. Appl. No. 13/562,201, filed Jul. 30, 2012, entitled "Relationship Discovery in Business Analytics", invented by Chu, Y.J., S. Han, J. Shyr, D. Spisic, and X. Zhang, Total 61 pp.

U.S. Appl. No. 13/154,594, filed Jun. 7, 2011, entitled "Automatic Selection of Different Visualizations for the Organization of Multivariate Data", Total 57 pp.

U.S. Appl. No. 13/550,985, filed Jul. 17, 2012, entitled "Automatic Selection of Different Visualizations for the Organization of Multivariate Data", Total 55 pp.

Preliminary Amendment, Mar. 8, 2013, for U.S. Appl. No. 13/562,201, filed Jul. 30, 2012 by Y.J. Chu et al., Total 6 pp. [54.84 (PrelimAmend)].

Notice of Allowance, dated Jan. 6, 2014, for U.S. Appl. No. 13/562,201 (54.84), filed Jul. 30, 2012, entitled "Relationship Discovery in Business Analytics", invented by Yea J. Chu et al., pp. 1-17.

Office Action, dated Aug. 7, 2013, for U.S. Appl. No. 13/562,201 (54.84), filed Jul. 30, 2012, entitled "Relationship Discovery in Business Analytics", invented by Yea J. Chu et al., pp. 1-31.

Response to Office Action, dated Aug. 7, 2013, for U.S. Appl. No. 13/562,201 (54.84), filed Jul. 30, 2012, entitled "Relationship Discovery in Business Analytics", invented by Yea J. Chu et al., pp. 1-12.

Notice of Allowance, dated Oct. 20, 2014, for U.S. Appl. No. 13/562,201, filed Jul. 30, 2012, invented by Y.J. Chu et al., Total 11 pages.

* cited by examiner

| Measure Y Table Dimension(s) | • Count - The number of records corresponding to each table cell ($N_k$, $k=1,...,K$.)<br>• Mean - The mean value of Y for the records corresponding to each table cell ($\bar{y}_k$, $k=1,...,K$.)<br>• Variance - The variance of Y for the records corresponding to each table cell ($V_k$, $k=1,...,K$.) |
|---|---|

FIG. 6

| Goodness of Fit | $R^2 = 1 - SSE / SST.$ |
|---|---|
| Summary statistics | • $SST$, the total sum of the squares in a linear model and it is computed as $$SST = \sum_{k=1}^{K} (N_k - 1) V_k + \sum_{k=1}^{K} N_k \bar{y}_k^2 - \left(\sum_{k=1}^{K} N_k \bar{y}_k\right)^2 / \sum_{k=1}^{K} N_k.$$ • $SSE$, the residual sum squares in a linear model and it is computed as $$SSE = \sum_{k=1}^{K} (N_k - 1) V_k.$$ |

FIG. 7

| Index | Statistics |
|---|---|
| Significance of interaction | The p-value is computed for statistic F from the distribution $F(df_{interaction}, df_e)$<br><br>where $F = \dfrac{SS_{interaction}/df_{interaction}}{SSE/df_e}$,<br><br>• $SS_{interaction}$ is the interaction sum of squares. See Table 1200 for the computation process.<br>• $df_{interaction}$ is the interaction degrees of freedom. Typically, it is the product of the number of cells reduced by one in each dimension.<br>• $df_e$, the error degrees of freedom equals the total number of records minus the number of cells in the table |
| Interaction effect size | Eta squared:<br>$SS_{interaction} / SST$ |

| Model | Process |
|---|---|
| Multiple Table Dimensions | (1) Create a table containing the mean of $Y$ and the number of records in each cell.<br><br>(2) Compute marginal mean of $Y$ for each cell of a single dimension by averaging $Y$ over all table cells containing the same category in the given dimension.<br><br>(3) Update the cell means of $Y$ in the whole table by subtracting the corresponding marginal mean from each cell.<br><br>(4) Repeat the steps (2) and (3) above for each dimension in the table.<br><br>(5) For tables with three dimensions, repeat the steps (2) and (3) for each pair of dimensions representing a marginal sub-table.<br><br>(6) Compute $SS_{interaction}$ from the updated cell means of $Y$, by multiplying the squared mean for each cell with the cell number of records to obtain $SS_{cell}$ and summing over all cells in the table.<br><br>(7) Repeat steps (2) to (6) until the difference of $SS_{interaction}$ in two successive iterations is smaller than a preset tolerance value, and output the approximated $SS_{interaction}$ of the final iteration. |

FIG. 12

| Aspect | Statistics | Interpretation and insights | Comments |
|---|---|---|---|
| Interaction effect | *Significance* | Interaction effect significance: $p < c_{eff}$ interaction significant $p \geq c_{eff}$ interaction not significant. | The tables of each dimension are sorted by their *Effect size*. *Significance* is included as additional information. |
| | *Effect Size* | Interaction effect size: $Effect < c_1$ is weak $c_1 \leq Effect < c_2$ is moderate $c_2 \leq Effect$ is strong. | See the Table 1100 for the *Effect size* computation formula. |
| Table cell | *Cell Influence* | Cell influence: $p \geq c_{cell}$ cell is not influential $p < c_{cell}$ cell is influential. | All cells in the tables with a significant interaction effect are evaluated and the cells with high contribution are called influential. See the Table 1500 for computation details. |

| Input Statisics (see Table 1200) | • $SS_{interaction}$, the interaction sum of squares<br>• $SS_{cell}$, the interaction sum of squares in a given cell |
|---|---|
| Detection | The influential cell can be detected by the following steps:<br>(1) Estimate variance of residual in a cell: the variance $s^2$ is estimated as the $SS_{interaction}$ divided by the total number of cells.<br>(2) Compute the p-value for each cell using statistic $w_{cell}$ from the chi-square distribution with 1 degree of freedom ($\chi^2(1)$) where $$w_{cell} = SS_{cell}/s^2$$ |

FIG. 15

| Claim Type - Dimension | Aggregated Input Statistics |
|---|---|
| Wind/Hail | (1054, 16.78, 420.92) |
| Water damage | (627, 35.29, 2261.86) |
| Fire/Smoke | (1039, 171.58, 41834.04) |
| Contamination | (404, 202.21, 51833.39) |
| Theft/Vandalism | (1291, 17.48, 638.90) |

| Property Condition - Dimension | Aggregated Input Statistics |
|---|---|
| Habitable | (3772, 47.02, 7735.18) |
| Unhabitable | (643, 225.47, 70681.90) |

| Property Type - Dimension | | Aggregated Input Statistics |
|---|---|---|
| | Commercial | (338, 86.22, 32128.49) |
| | Residential | (4077, 71.92, 19908.86) |

|  | | Property Condition - Dimension | |
|---|---|---|---|
|  | | Habitable | Unhabitable |
| Claim Type - Dimension | Wind/Hail | (1001, 15.45, 299.28) | (53, 41.95, 2088.72) |
| | Water damage | (571, 29.93, 1039.92) | (56, 89.90, 11632.38) |
| | Fire/Smoke | (739, 126.84, 19974.02) | (300, 281.78, 78799.19) |
| | Contamination | (241, 133.94, 17915.05) | (163, 303.15, 85217.00) |
| | Theft/Vandalism | (1220, 15.41, 265.59) | (71, 53.11, 5786.45) |

FIG. 19

| | | Property Type - Dimension | | | |
|---|---|---|---|---|---|
| | | Commercial | | Residential | |
| | | Property Condition - Dimension | | Property Condition - Dimension | |
| | | Habitable | Unhabitable | Habitable | Unhabitable |
| ClaimType -Dimension | Wind/Hail | (81, 17.76, 389.53) | (4, 19.88, 12.62) | (920, 15.25, 291.23) | (49, 43.75, 2218.09) |
| | Water damage | (43, 27.39, 1003.95) | (4, 185.19, 47283.53) | (528, 30.14, 1044.18) | (52, 82.57, 8996.37) |
| | Fire/Smoke | (50, 186.18, 62936.34) | (27, 327.15, 76241.75) | (689, 122.54, 16668.78) | (273, 277.29, 79108.80) |
| | Contamination | (13, 143.27, 17396.79) | (11, 327.18, 149748.36) | (228, 133.40, 18016.09) | (152, 301.41, 81462.63) |
| | Theft/Vandalism | (100, 18.98, 405.38) | (5, 40.74, 981.30) | (1120, 15.09, 252.22) | (66, 54.05, 6158.51) |

RELATIONSHIP DISCOVERY IN BUSINESS ANALYTICS

CROSS-REFERENCE TO RELATED APPLICATION

This patent application is a continuation of U.S. patent application Ser. No. 13/562,201, filed Jul. 30, 2012, which patent application is incorporated herein by reference in its entirety.

FIELD

Embodiments of the invention relate to relationship discovery in business analytics.

BACKGROUND

Data warehouses typically contain two major types of data elements available for analysis: dimensions and measures. Each dimension is tied to a categorical attribute such as product, market, time, channel, scenario, customer, etc. Given a dimension, every item in a data set can be categorized according to its dimension. A dimension may be described as a categorical attribute or a categorical field. A measure represents a data field that is associated with particular dimension categories (i.e., dimension values) and that can be used for calculations such as summation and averaging. A measure may be described as a continuous target. For an example, the average amount of money customers spent in a given store can be calculated based on the amount of customer spending and the store dimension.

Data analysts today have to deal with increasingly large volumes of data. Attempting to find insights in large amounts of data (e.g., terabytes, petabytes, etc.), with many possible combinations between categorical attributes, is a difficult task. A common business scenario is identifying the relationship and influence of dimensions generated by categorical fields or categorical attributes on a continuous target. The goal for the data analyst is to determine which of the dimensions are relevant to the measure and among those that are relevant, discerning the magnitude of their impact. Ultimately, the goal is to produce a series of aggregated tabular reports that illustrate measure-dimension relationships.

The following is an example 2-dimensional table:

|       | $X_2$  |        |     |        |
|-------|--------|--------|-----|--------|
| $X_1$ | 1      | 2      | ... | S      |
| 1     | (1, 1) | (1, 2) | ... | (1, S) |
| 2     | (2, 1) | (2, 2) | ... | (2, S) |
| .     | .      | .      | ⋱   | .      |
| .     | .      | .      |     | .      |
| R     | (R, 1) | (R, 2) | ... | (R, S) |

In the example 2-dimensional table, suppose dimension $X_1$ has R categories (1, ..., R) and dimension $X_2$ has S categories (1, ..., S). For a 2-dimensional table, the cells in the first column and the cells in the first row may be described as "dimension cells" for dimension $X_1$ and dimension $X_2$, respectively. A category may be described as a value or label of a dimension cell. On the other hand, the elements from these two dimensions (i.e., the remaining cells in the table) may be described as "table cells" and would contain statistics about the continuous target with two dimensions.

That is, dimension cells may be said to correspond to categories of the matching categorical attribute, while table cells may be said to correspond to combinations of categories from categorical attributes matching different dimensions.

It is from relationships between dimensions and measures that analysts derive insights into their businesses. The challenge is trying to navigate through what may possibly be thousands of reports, each representing a possible measure-dimension combination.

Exploring data to detect important dimensions is difficult and tedious. Even with existing tools, data analysts need to be skilled in statistical analysis and data mining. The volume of data exacerbates the problem even for the experts. Organizations have invested heavily in data acquisition and storage technologies, and the organizations understand the value of data and believe in the business analytic proposition. However, there is a shortage of individuals capable of defining, executing, and extracting valuable information from a statistical analysis.

SUMMARY

Provided are a method, computer program product, and system for receiving a subset of (k−1)-dimensional tables, wherein k is greater than 1, creating a set of k-dimensional tables by combining each of the (k−1)-dimensional tables with a non-included dimension corresponding to a 1-dimensional table, and computing significance of interaction and interaction effect size for the created set of k-dimensional tables to determine dimension and measure interactions.

BRIEF DESCRIPTION OF THE SEVERAL VIEWS OF THE DRAWINGS

Referring now to the drawings in which like reference numbers represent corresponding parts throughout:

FIG. 6 illustrates a table of search layer aggregated input statistics in accordance with certain embodiments.

FIG. 7 illustrates a table that specifies a search index in terms of summaries derived from aggregated input statistics in accordance with certain embodiments.

FIG. 9 is formed by FIG. 9A and FIG. 9B.

FIG. 11 illustrates a table that specifies interaction indices in terms of various summaries derived from aggregated input statistics in accordance with certain embodiments.

FIG. 12 illustrates a table that contains a description of a process for computing more involved interaction summaries (i.e., sum of squares) in accordance with certain embodiments.

FIG. 14 illustrates a report profile template in accordance with certain embodiments.

FIG. 15 illustrates a table that describes an influential cells detection procedure in accordance with certain embodiments.

FIG. 17 is formed by FIG. 17A, FIG. 17B, and FIG. 17C.

FIGS. 18A, 18B, and 18C illustrate example 1-dimensional tables in accordance with certain embodiments.

FIG. 19 illustrates an example 2-dimensional table in accordance with certain embodiments.

FIG. 20 illustrates an example 3-dimensional table in accordance with certain embodiments.

DETAILED DESCRIPTION

Figure 1:
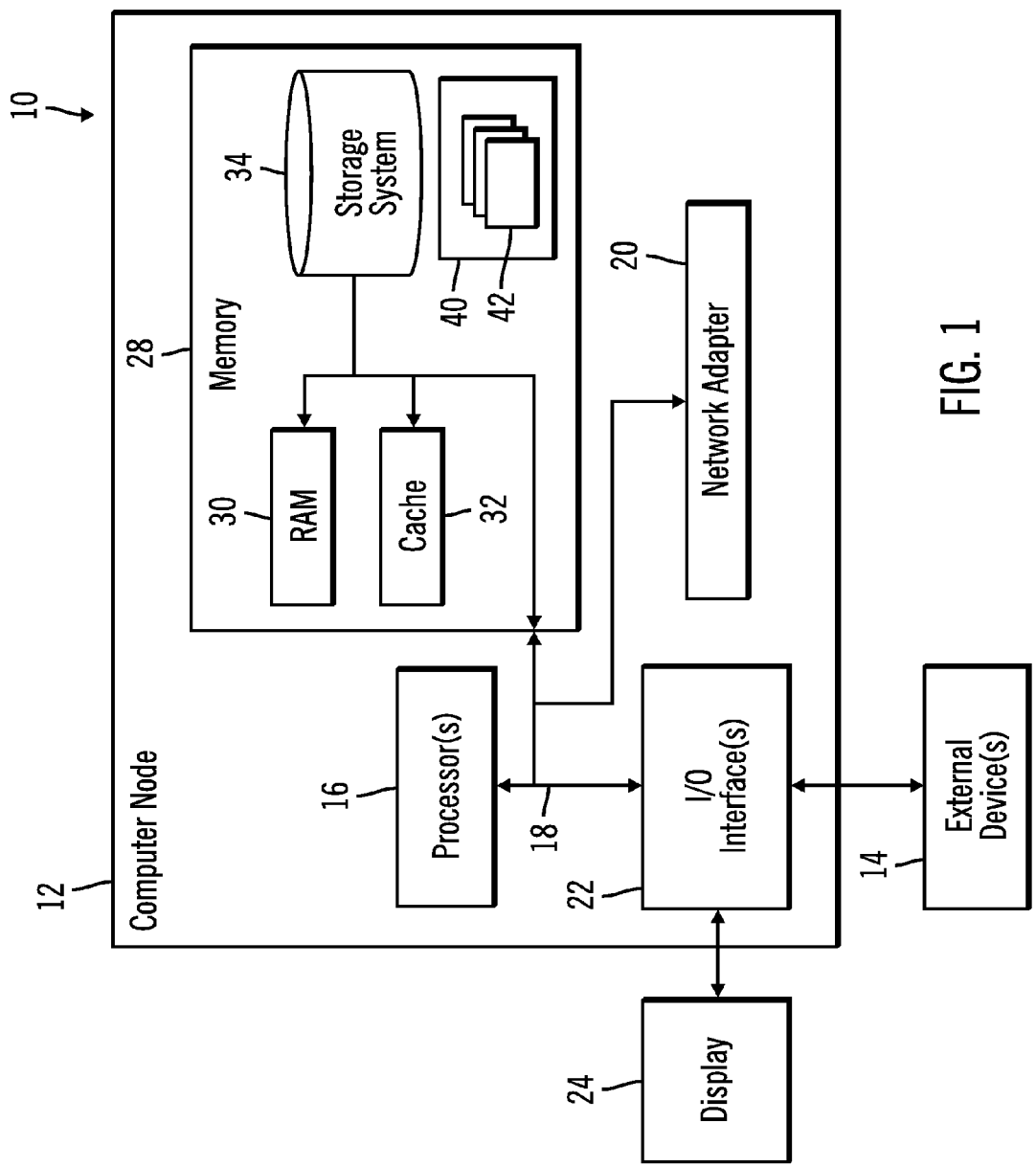
FIG. 1 depicts a cloud computing node in accordance with certain embodiments.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors 16 or processing units, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
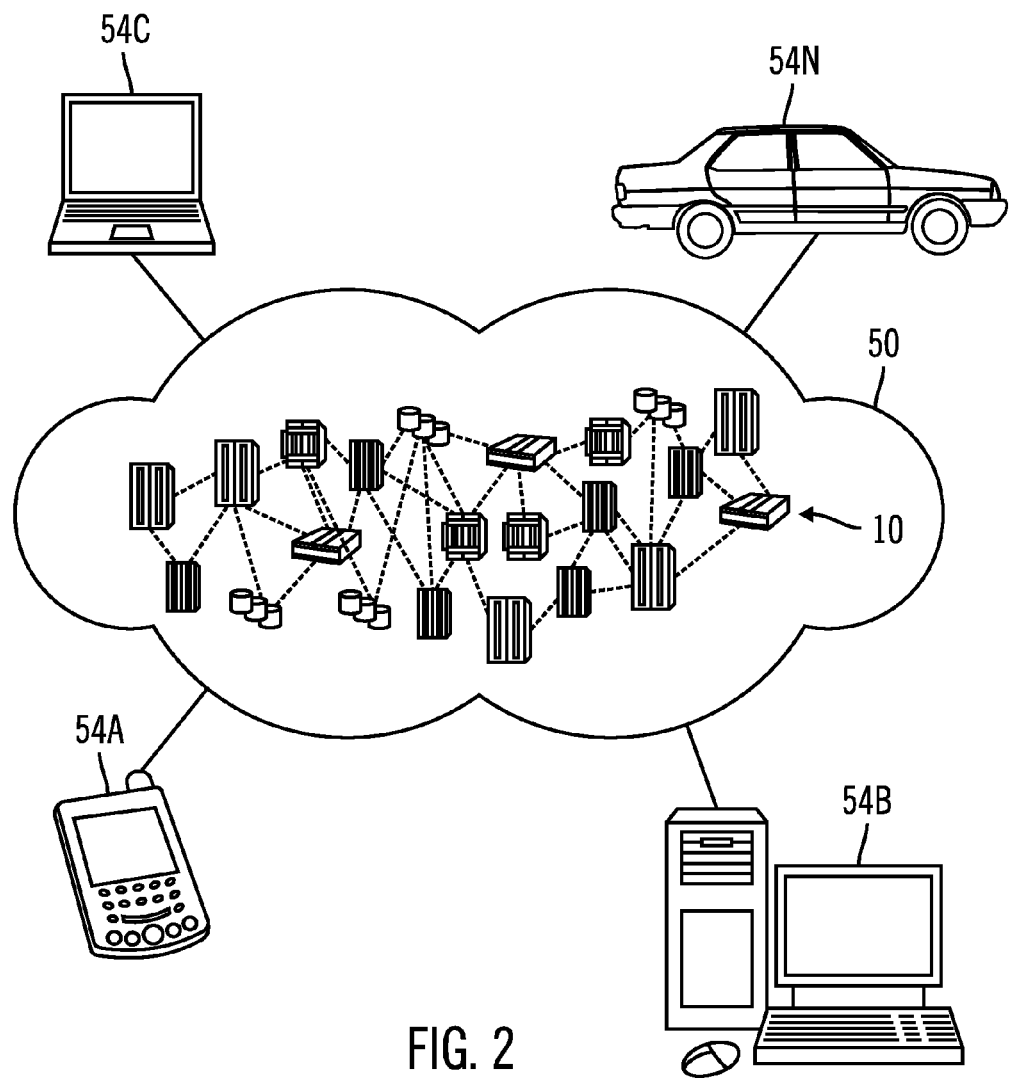
FIG. 2 depicts a cloud computing environment in accordance with certain embodiments.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
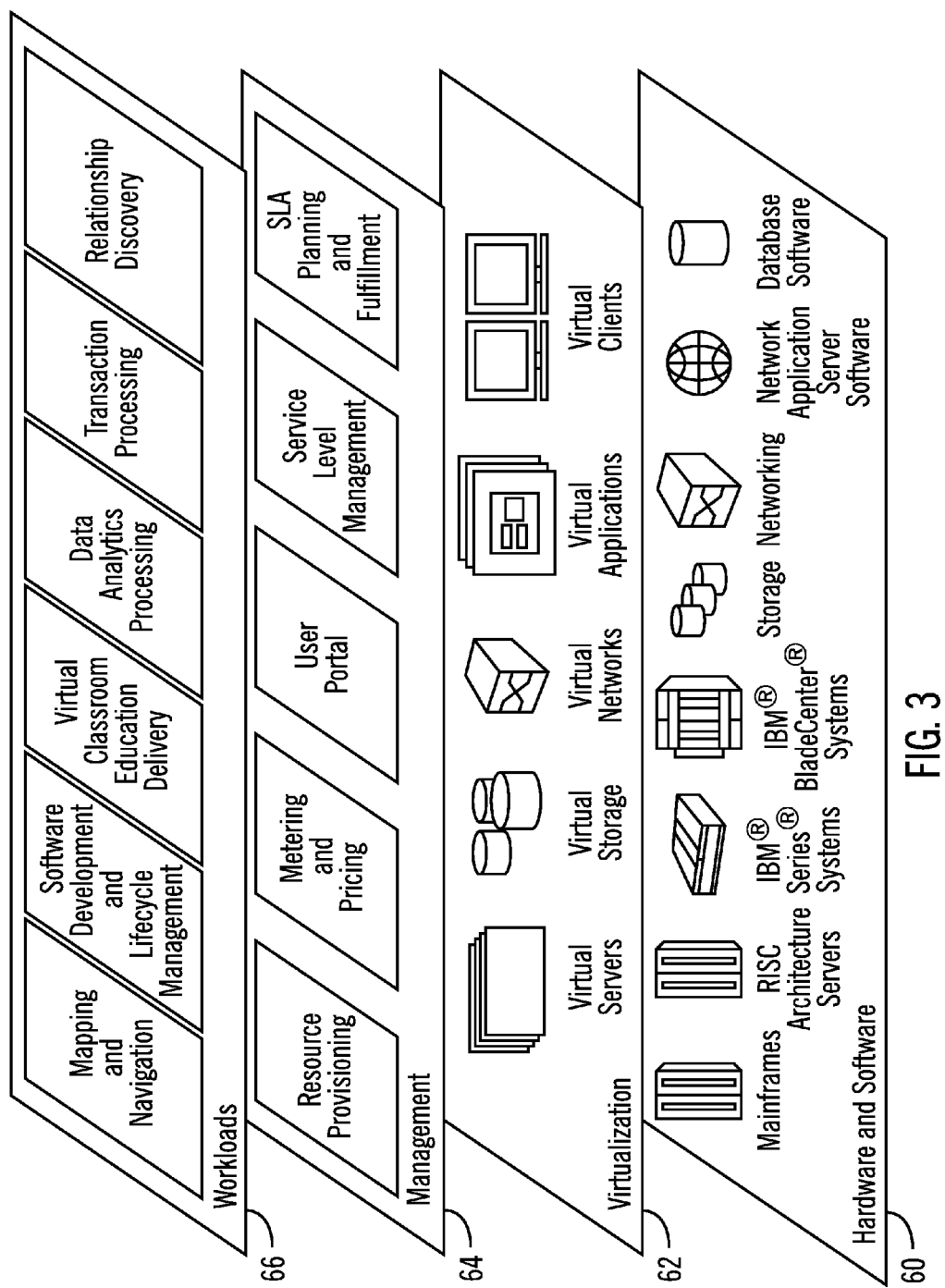
FIG. 3 depicts abstraction model layers in accordance with certain embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and relationship discovery.

Thus, in certain embodiments, software, implementing relationship discovery in accordance with embodiments described herein, is provided as a service in a cloud environment.

Figure 4:
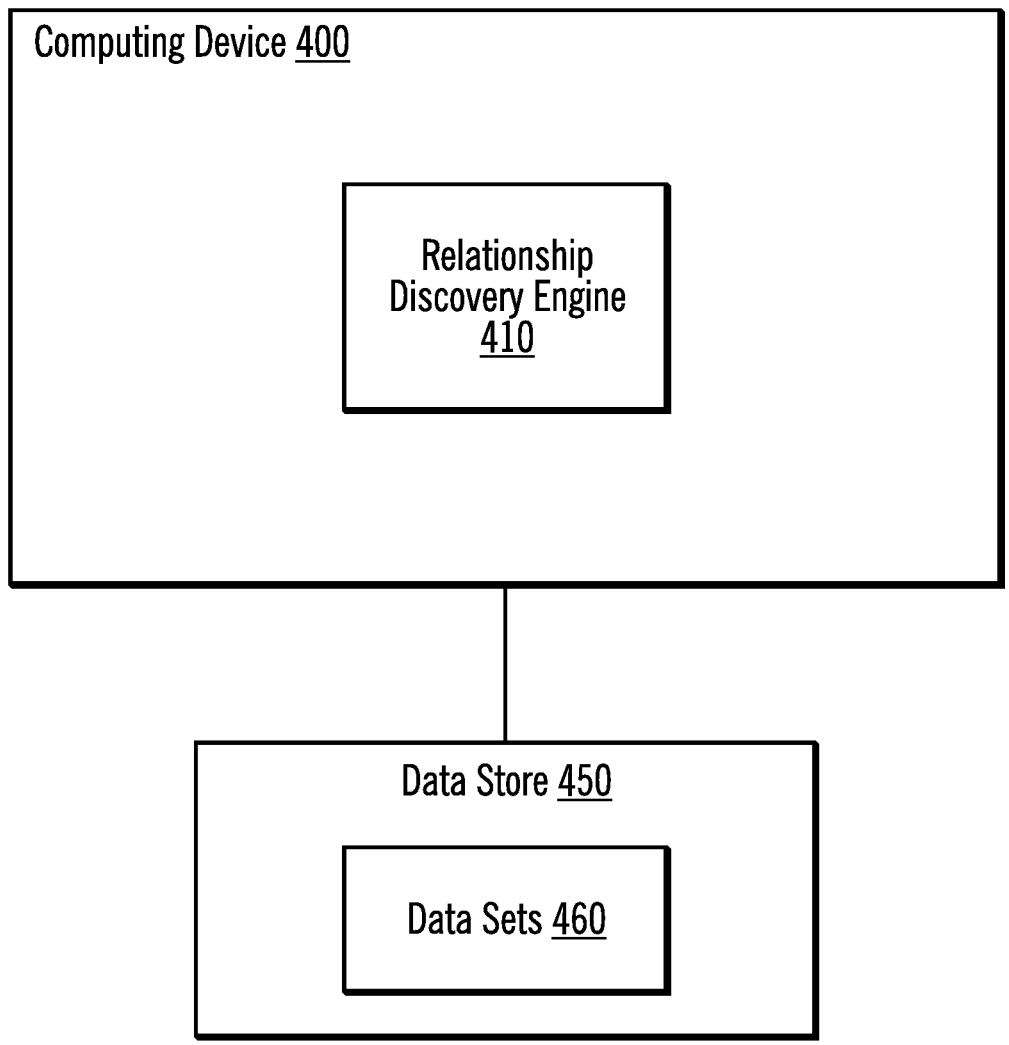
FIG. 4 illustrates a computing environment in accordance with certain embodiments.

FIG. 4 illustrates a computing environment in accordance with certain embodiments. A computing device 400 includes a relationship discovery engine 410. The computing device 400 is coupled to a data store 450. The data store 450 stores data sets 460, and each of the data sets includes record data that includes a measure of interest (i.e., a continuous target) and multiple dimensions (i.e., categorical attributes or categorical fields).

While the embodiments are not tied to data warehouses, embodiments use dimensions and measures as familiar terms to distinguish between categorical attributes and continuous targets available in data structures.

In certain embodiments, the computing device 400 has the architecture of computing node 10. In certain embodiments, the computing device 400 is part of a cloud environment. In certain alternative embodiments, the computing device 400 is not part of a cloud environment.

Given a data set and a measure of interest, the relationship discovery engine 410 generates a multitude of aggregate tabular reports based on a subset of dimensions. The relationship discovery engine 410 provides a model based and scalable process for generation of reports exhibiting strong dimension interactions. An interaction describes a situation in which the simultaneous influence of two dimensions on the measure is not additive.

The analysis for each aggregate report is based on a statistical model including the corresponding measure and the dimensions determining the table dimensions. Model based statistics are used for analysis of the overall dispersion of the measure values among the table cells and detection of the dimension interactions. The detected dimension interactions are ranked according to their strength and reported to the user (e.g., a data analyst or system administrator).

In certain embodiments (e.g., for data sets with a large number of dimensions), the relationship discovery engine 410 does not generate and analyze all possible aggregate tables, even with a low number of dimensions. For example, data with 100 dimensions would generate the total of 166,750 tables with three or fewer dimensions.

In certain embodiments, the relationship discovery engine 410 applies a structured search in which the tables with a single dimension are considered first. The tables with two or three dimensions are considered selectively, based on the analysis of the corresponding tables of lower dimension. This ensures that the computational effort needed for generating and analyzing the tables is limited. It is also effective by resulting in the detection of a higher number of relevant tables than by a random search of comparable size.

The relationship discovery engine 410 further analyzes the top tables by detecting any cells with high contribution to the significant interaction effect. The overall model based summaries, as well as, the results of the cell-by-cell analyses are made available for output to the user.

Figure 5:
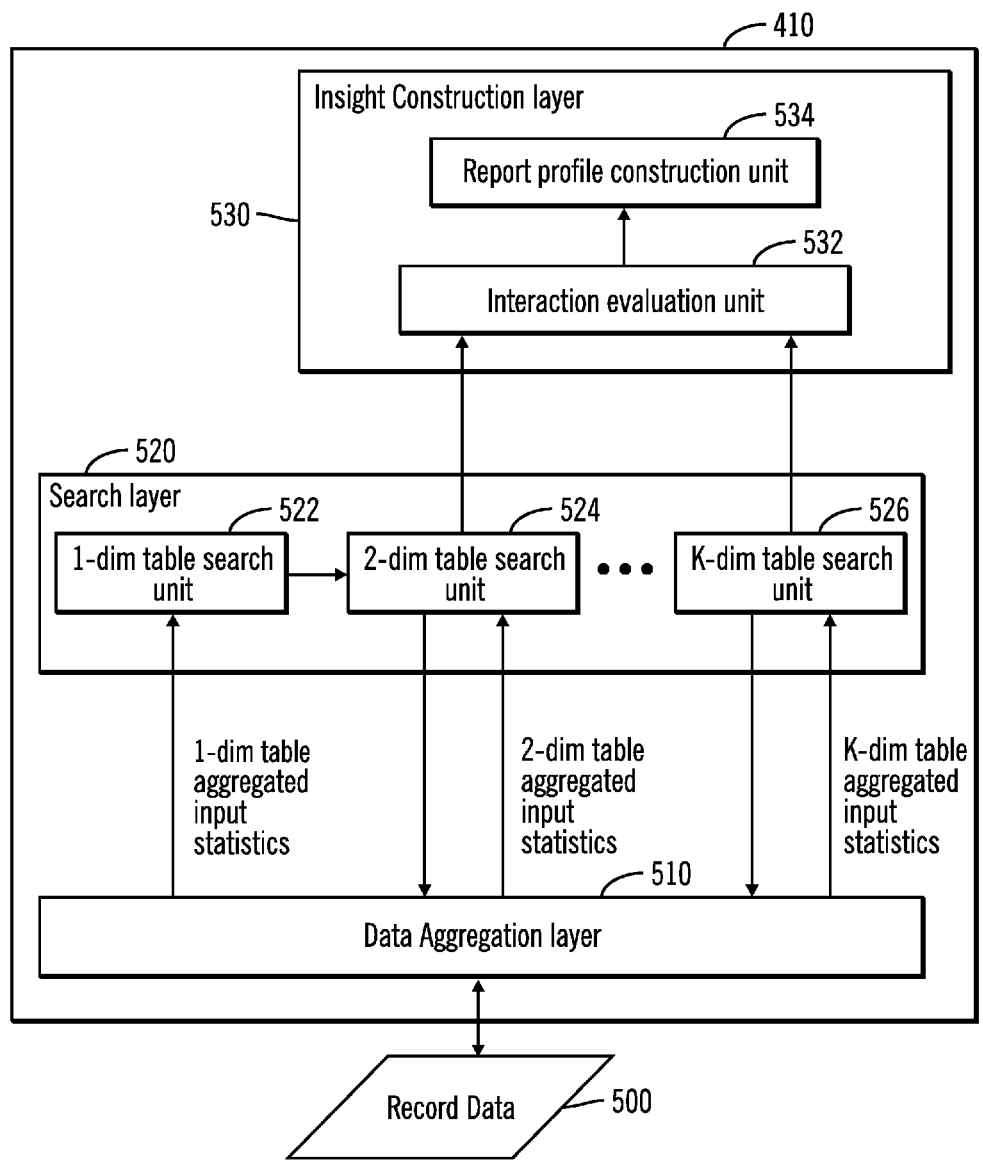
FIG. 5 illustrates a framework and a functional flow chart for relationship discovery in accordance with certain embodiments.

FIG. 5 illustrates a framework and a functional flow chart for relationship discovery in accordance with certain embodiments. In FIG. 5, record data 500 contains a measure of interest and a potentially large number of dimensions. In certain embodiments, the relationship discovery engine 410 includes a data aggregation layer 510, a search layer 520, and an insight construction layer 530. The data aggregation layer 510 processes records from the record data 500 and generates aggregated input statistics in aggregated reporting tables for combinations of dimensions (e.g., for 1-dimensional tables, for 2-dimensional tables . . . for K-dimensional tables, where K may be any positive integer). A 1-dimensional table may be described as a table of cells corresponding to the categories of one dimension; a 2-dimensional table may be described as a table of cells corresponding to the combinations of categories from two dimensions; and a k-dimensional table may be described as a table of cells corresponding to the combinations of categories from k dimensions. The data aggregation layer 510 generates the aggregated input statistics for multiple tables in a single processing of the record data 500. Aggregated input statistics may be described as statistics, such as those in FIG. 6, that aggregate measure values corresponding to each table cell.

The search layer 520 creates consecutive lists of limited numbers of tables for which the aggregated input statistics are generated by the data aggregation layer 510. Tables created in each list are aggregated during a single processing of the record data 500. In particular, the search layer 520 includes a 1-dimensional table search unit 522, a 2-dimensional table search unit 524 . . . a K-dimensional table search unit 526. Each table search unit performs a search over a particular (e.g., 1-dimensional, 2-dimensional or K-dimensional) table generated for different dimensions.

The inputs to the search layer 520 are the aggregated input statistics within data aggregated reporting tables of up to K-dimensions. In certain embodiments, the inputs to the search layer 520 are the aggregated input statistics within data aggregated reporting tables of up to 3-dimensions. Each table dimension is formed by a different dimension with potential to impact the measure.

FIG. 6 illustrates a table 600 of search layer 520 aggregated input statistics in accordance with certain embodiments. The aggregated input statistics comprise count (which is the number of records corresponding to each table cell), mean (which is the mean value of the measure for records corresponding to each table cell), and variance (which is a centered sum of squares of the measure for the records corresponding to each table cell, divided by the number of records minus one). In certain embodiments, the centered sum of squares may be computed by subtracting the cell mean from each measure before taking the measure's square.

Upon receiving the aggregated input statistics for 1-dimensional tables from the data aggregation layer 510, the 1-dimensional table search unit 522 performs a 1-dimensional table search to find the most interesting 1-dimensional tables for output and extension. In certain embodiments, the aggregated input statistics are received for all 1-dimensional tables. Extension may be described as processes of augmenting tables with an additional dimension. For example, blocks 902 (FIG. 9) and 1002 (FIG. 10) "extend" the 1-dimensional and 2-dimensional tables by adding a dimension.

The search layer 520 then sends a request to the data aggregation layer 510 for the aggregated input statistics for the 2-dimensional tables based on the output from the 1-dimensional table search unit 522. Upon receiving the aggregated input statistics for the 2-dimensional tables, the 2-dimensional table search unit 524 performs a 2-dimensional tables search to find the most interesting 2-dimensional tables for output and extension.

As this continues, the search layer 520 sends a request to the data aggregation layer 510 for the aggregated input statistics for 3-dimensional tables based on the output from the 2-dimensional table search unit 524. Upon receiving the aggregated input statistics for the 3-dimensional tables, the 3-dimensional table search unit performs a 3-dimensional tables search to find the most interesting 3-dimensional tables for output and optionally for extension. This processing may continue for K-dimensions.

Such processing between the data aggregation layer 510 and the search layer 520 goes on for K-dimensions. In certain embodiments, a user identifies the highest number of dimensions, K.

In certain embodiments, the search and sorting strategy employed in the 1, 2, ... k-dimensional table search units 522, 524 ... 526 rely on the ANOVA model based search index goodness of fit. Goodness of fit may be described as a model-based summary statistic that evaluates the overall model capability to describe the given data. FIG. 7 illustrates a table 700 that specifies a search index in terms of summaries (i.e., summary statistics) derived from aggregated input statistics in accordance with certain embodiments. Table 700 describes the computation process for calculating the goodness of fit $R^2$ using a total sum of the squares of the measure Y and an error of sum squares of the measure Y.

Figure 8:
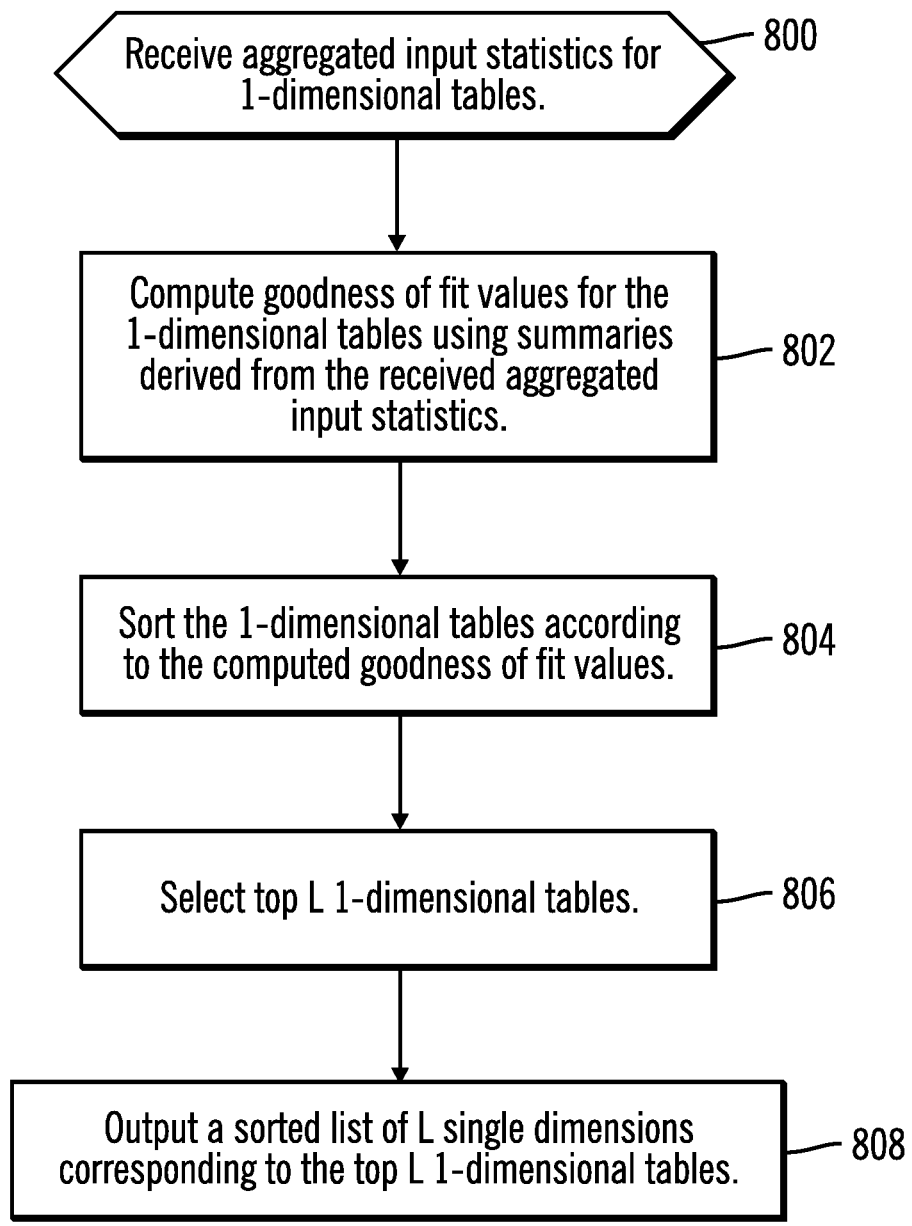
FIG. 8 illustrates, in a flow diagram, operations performed on 1-dimensional tables in accordance with certain embodiments.

FIG. 8 illustrates, in a flow diagram, operations performed on 1-dimensional tables in accordance with certain embodiments. Control begins at block 800 with the 1-dimensional table search unit 522 receiving aggregated input statistics for 1-dimensional tables from the data aggregation layer 510. In certain embodiments, the inputs to the 1-dimensional table search unit 522 are aggregated input statistics listed in table 600 (FIG. 6) for each table. In block 802, the 1-dimensional table search unit 522 computes goodness of fit values for the 1-dimensional tables using summaries derived from the received aggregated input statistics. In accordance with certain embodiments, the goodness of fit values are computed using the formula described with reference to table 700, following an Analysis of Variance (ANOVA) model for the 1-dimensional tables. ANOVA may be described as a type of statistical model for a given measure and a set of dimensions. In block 804, the 1-dimensional table search unit 522 sorts the 1-dimensional tables by the computed goodness of fit values. In block 806, the 1-dimensional table search unit 522 selects the top L 1-dimensional tables (where L may be any positive integer) based on the goodness of fit values. In certain embodiments, the top L 1-dimensional tables have goodness of fit values exceeding a first threshold value. Various threshold values are referred to herein, and, in various embodiments, these threshold values may have the same or different values. In block 808, the 1-dimensional table search unit 522 outputs a sorted list of L single dimensions (i.e., top dimensions) corresponding to the top L 1-dimensional tables to the 2-dimensional table search unit 524.

The sorted list of dimensions corresponding to the top L 1-dimensional tables is sent to the 2-dimensional table search unit 524. In certain embodiments, the number L is chosen (e.g., by a user) so that the number of considered tables remains limited to conserve time and memory, but the number L is as large as possible for accuracy purposes.

Figure 9A:
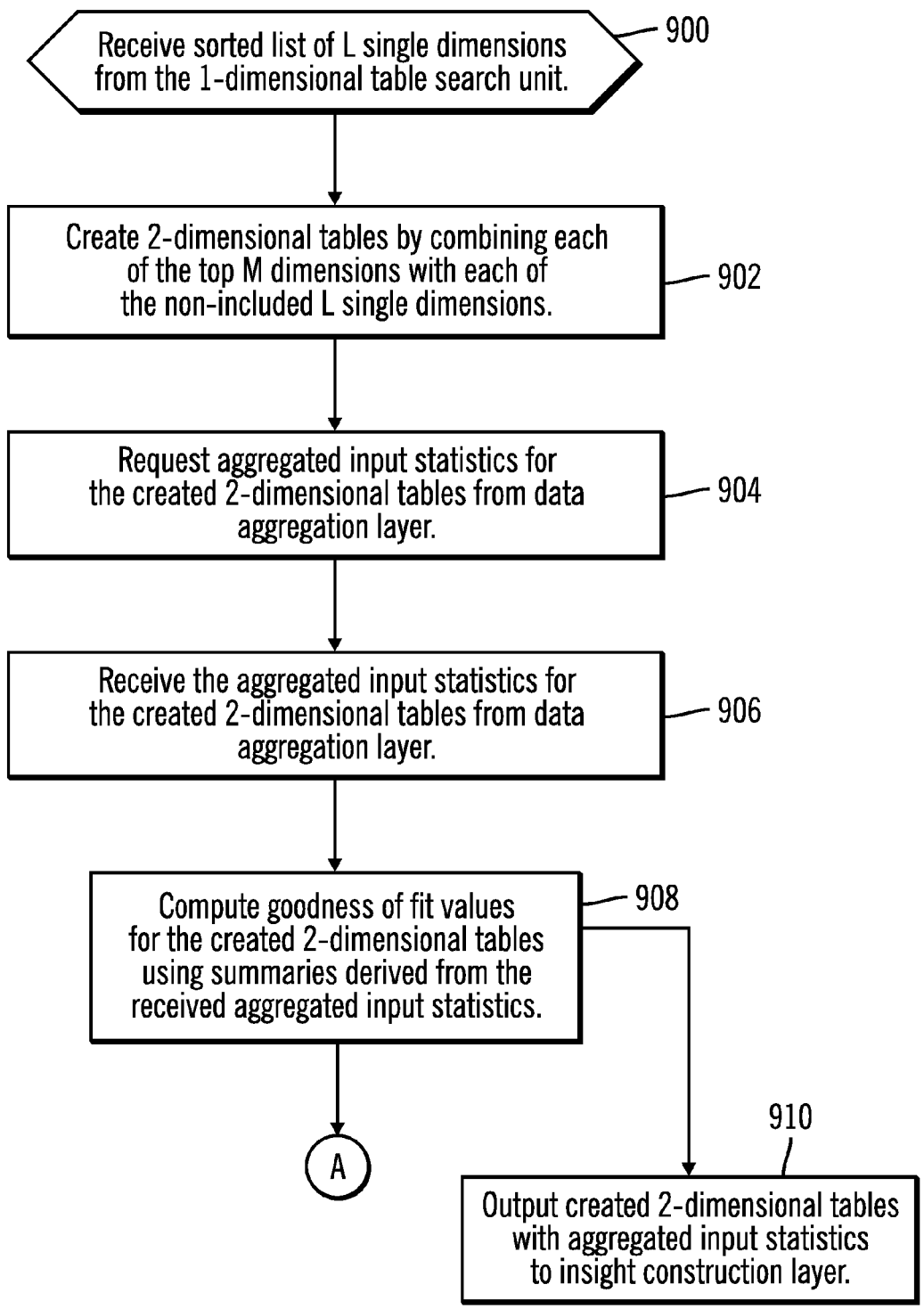
FIG. 9 illustrates, in a flow diagram, operations to create 2-dimensional tables in accordance with certain embodiments.
Figure 9B:
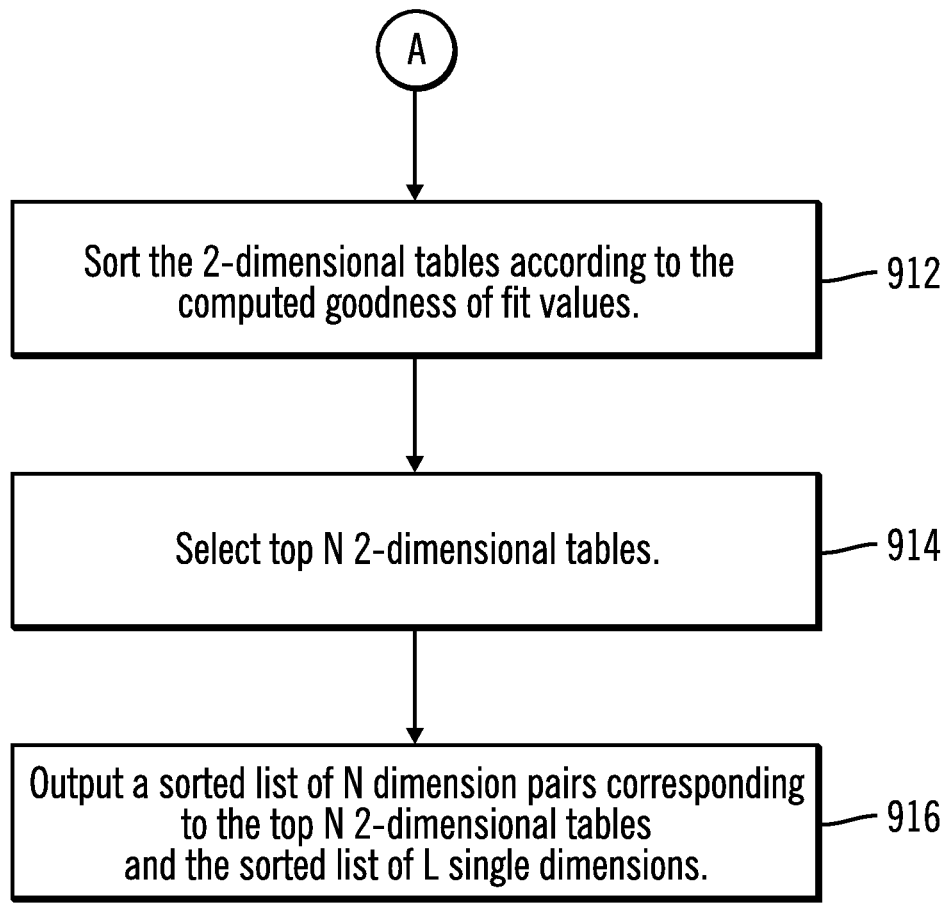

FIG. 9 illustrates, in a flow diagram, operations to create 2-dimensional tables in accordance with certain embodiments. FIG. 9 is formed by FIG. 9A and FIG. 9B. Control begins at block 900 with the 2-dimensional table search unit 524 receiving sorted list of L single dimensions from the 1-dimensional table search unit 522. In block 902, the 2-dimensional table search unit 524 creates 2-dimensional tables by combining each of the top M dimensions with each of the non-included L single dimensions (where M may be any positive integer). In certain embodiments, the top M dimensions correspond to 1-dimensional tables that have goodness of fit values exceeding a second threshold value. In certain embodiments, the number M is smaller than L and is chosen so that the total number of created tables is limited to conserve computational resources. In block 904, the 2-dimensional table search unit 524 requests aggregated input statistics for the created 2-dimensional tables from the data aggregation layer 510. In certain embodiments, the aggregated input statistics are those listed in table 600 (FIG. 6) for each 2-dimensional table. In block 906, the 2-dimensional table search unit 524 receives the aggregated input statistics for the created 2-dimensional tables from the data aggregation layer 510. In block 908, the 2-dimensional table search unit 524 computes goodness of fit values for the created 2-dimensional tables using summaries derived from the received aggregated input statistics. In accordance with certain embodiments, the goodness of fit values are computed using the formula described with reference to table 700 (FIG. 7). From block 908 (FIG. 9A), processing continues simultaneously to block 910 (FIG. 9A) and to block 912 (FIG. 9B). In block 910, the 2-dimensional table search unit 524 outputs the created 2-dimensional tables with aggregated input statistics (i.e., the tables that have been originally created and then aggregated and processed) to the insight construction layer 530. In block 912, the 2-dimensional table search unit 524 sorts the 2-dimensional tables by the computed goodness of fit values. In block 914, the 2-dimensional table search unit 524 selects the top N 2-dimensional tables (where N may be any positive integer) based on the goodness of fit values. In certain embodiments, the top N 2-dimensional tables have goodness of fit values exceeding a third threshold value. In certain embodiments, the number N is chosen so that the number of considered 3-dim tables remains limited. In block 916, the 2-dimensional table search unit 524 outputs a sorted list of N dimension pairs corresponding to the top N 2-dimensional tables and the sorted list of L single dimensions to the 3-dimensional search unit.

Figure 10:
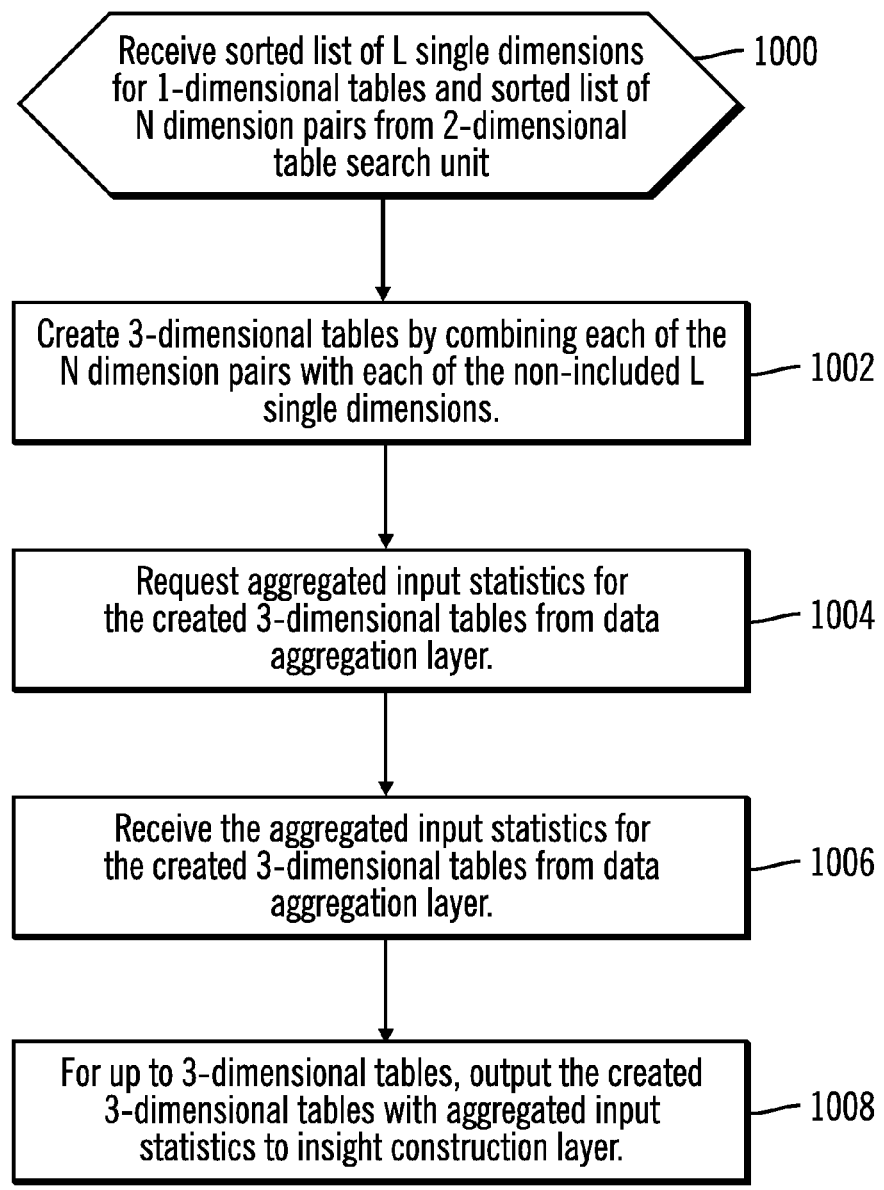
FIG. 10 illustrates operations to create 3-dimensional tables in accordance with certain embodiments.

FIG. 10 illustrates operations to create 3-dimensional tables in accordance with certain embodiments. Control begins at block 1000 with the 3-dimensional table search unit receiving the sorted list of L single dimensions for the 1-dimensional tables and the sorted list of N dimension pairs from the 2-dimensional table search unit. In block 1002, the 3-dimensional table search unit creates 3-dimensional tables by combining each of the N dimension pairs with each of the non-included L single dimensions. The non-included dimensions are ones that are not already in the 2-dimensional tables. Creating the 3-dimensional tables includes defining the dimensions for each of the 3-dimensional tables. In block 1004, the 3-dimensional table search unit requests aggregated input statistics for the created 3-dimensional tables from data aggregation layer 510. In certain embodiments, the aggregated input statistics are those listed in table 600 (FIG. 6) for each 3-dimensional table. In block 1006, the 3-dimensional table search unit receives the aggregated input statistics for the created 3-dimensional tables from data aggregation layer 510. In block 1008, for up to 3-dimensional tables, the 3-dimensional table search unit outputs the created 3-dimensional tables with aggregated input statistics (i.e., the tables that have been originally created and then aggregated and processed) to insight construction layer 530.

While the interaction effect size is a final quantity of interest, the goodness of fit values are used to create the candidate k-dimensional tables. Embodiments avoid computing the interaction effect size for all possible tables.

The insight construction layer 530 includes an interaction evaluation unit 532 and a report profile construction unit 534. Interaction indices may be described as measures of presence and strength of the interaction effects in the model. In certain embodiments, interaction indices employed in the interaction evaluation unit 532 are the ANOVA model based indices: significance of interaction and interaction effect size. The significance of interaction and interaction effect size are computed and applied to the 2-dimensional tables and the 3-dimensional tables considered in the insight construction layer 530. Significance of interaction may be described as statistical indication of its relevance when including the interaction effect into the model. Interaction effect size may be described as statistical indication of the relative size of the interaction effect with respect to the overall model. FIG. 11 illustrates a table 1100 that specifies the interaction indices in terms of various summaries derived from the aggregated input statistics in accordance with certain embodiments. FIG. 12 illustrates a table 1200 that contains a description of the process for computing more involved interaction summaries (i.e., sum of squares) in accordance with certain embodiments. The process of computing the significance of interaction and interaction effect size is described in tables 1100 and 1200 with reference to table 700. Table 1100 is a standard computation using ANOVA components. Table 1200 presents an older and rare technique for computing certain ANOVA model components. This technique is used because it allows computing the required model components based on the aggregated input statistics.

Figure 13:
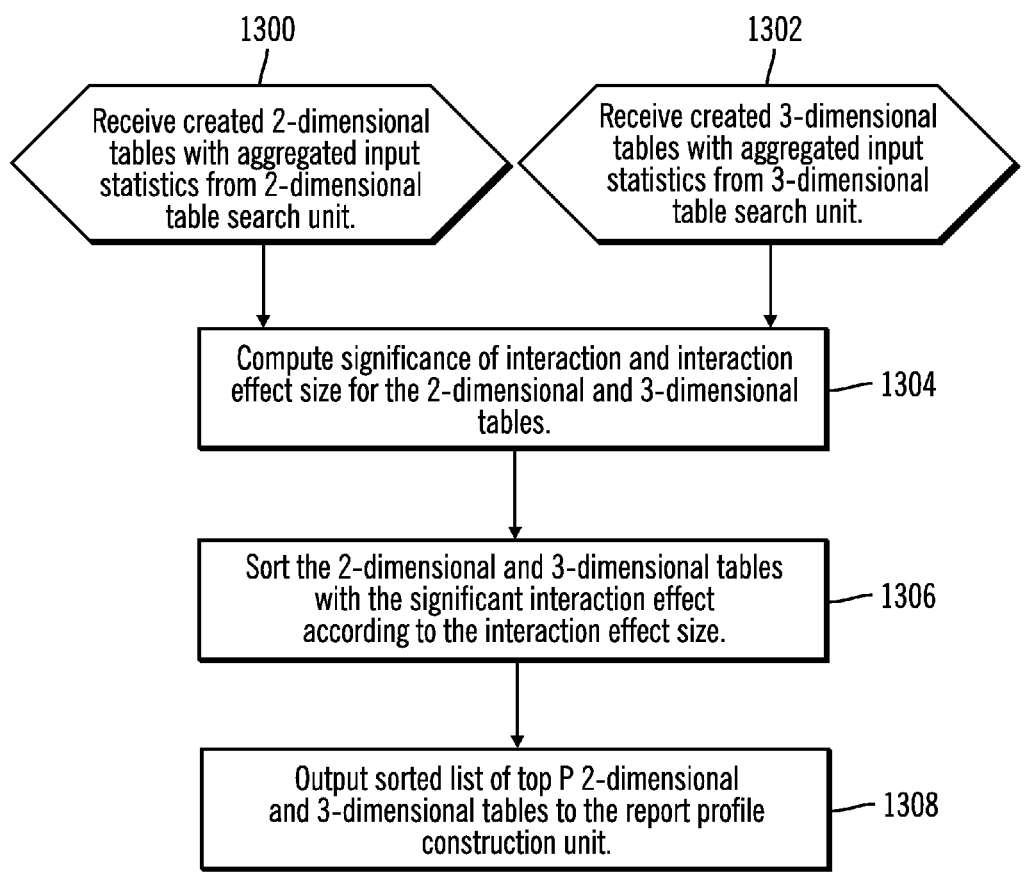
FIG. 13 illustrates, in a flow diagram, processing performed by an interaction evaluation unit in accordance with certain embodiments.

FIG. 13 illustrates, in a flow diagram, processing performed by the interaction evaluation unit 532 for 2-dimensional and 3-dimensional tables in accordance with certain embodiments. Control begins with the interaction evaluation unit 532 receiving the created 2-dimensional tables with aggregated input statistics from the 2-dimensional table search unit (block 1300) and receiving the created 3-dimensional tables with aggregated input statistics from the 3-dimensional table search unit (block 1302). In block 1304, the interaction evaluation unit 532 computes the significance of interaction and the interaction effect size for the 2-dimensional and 3-dimensional tables. In block 1306, the interaction evaluation unit 532 sorts the 2-dimensional and 3-dimensional tables that have significant interaction effect according to the interaction effect size. In block 1308, the interaction evaluation unit 532 outputs a sorted list of top P 2-dimensional and 3-dimensional tables to the report profile construction unit 534. In particular, computing the significance of interaction in block 1304 refers to determining whether the interaction effect is significant or not. Then, tables that have significant interaction effect are sorted in block 1306.

In certain embodiments, the report profile construction unit 534 generates profile statistics and interpretation with insights for top 2-dimensional and 3-dimensional tables. FIG. 14 illustrates a report profile template 1400 in accordance with certain embodiments.

FIG. 15 illustrates a table 1500 that describes an influential cells detection procedure in accordance with certain embodiments. The influential cells detection procedure uses a chi-square test based on the interaction sum of squares in each cell to determine the level of cell contribution to the interaction effect. A cell is detected as influential if the p-value statistic is smaller than a given threshold value. In various embodiments, the threshold value may have a default value (e.g., 0.05) which may be set by a system administrator or other user or may be calibrated with experiments.

The relationship discovery engine 410 employs two ANOVA model based indices for a given tabular report: goodness of fit and interaction effect size. Goodness of fit may be described as an index of the overall model fit that includes main effects, as well as, the interaction effects, and interaction effect size is used to assess the size of interaction effects directly.

The relationship discovery engine 410 relies on the goodness of fit within the search layer 520. Extending a table with a high goodness of fit index by a dimension that has a high goodness of fit as a 1-dimensional table results in the new table with high goodness of fit. This property is useful for search purposes because it enables analyzing tables of lower dimension and effectively predicting which tables of higher dimension have high goodness of fit. Also, another property of the goodness of fit index is that tables with high interaction effect size are more common among the tables with high goodness of fit.

The relationship discovery engine 410 utilizes both properties of the goodness of fit index in order to provide a scalable and effective discovery of tables with high interaction effect size. Discovering a number of tables with high interaction effect size is useful for data analysts gaining insights about non-obvious relationships between the measure and dimensions in the given data set.

Figure 16:
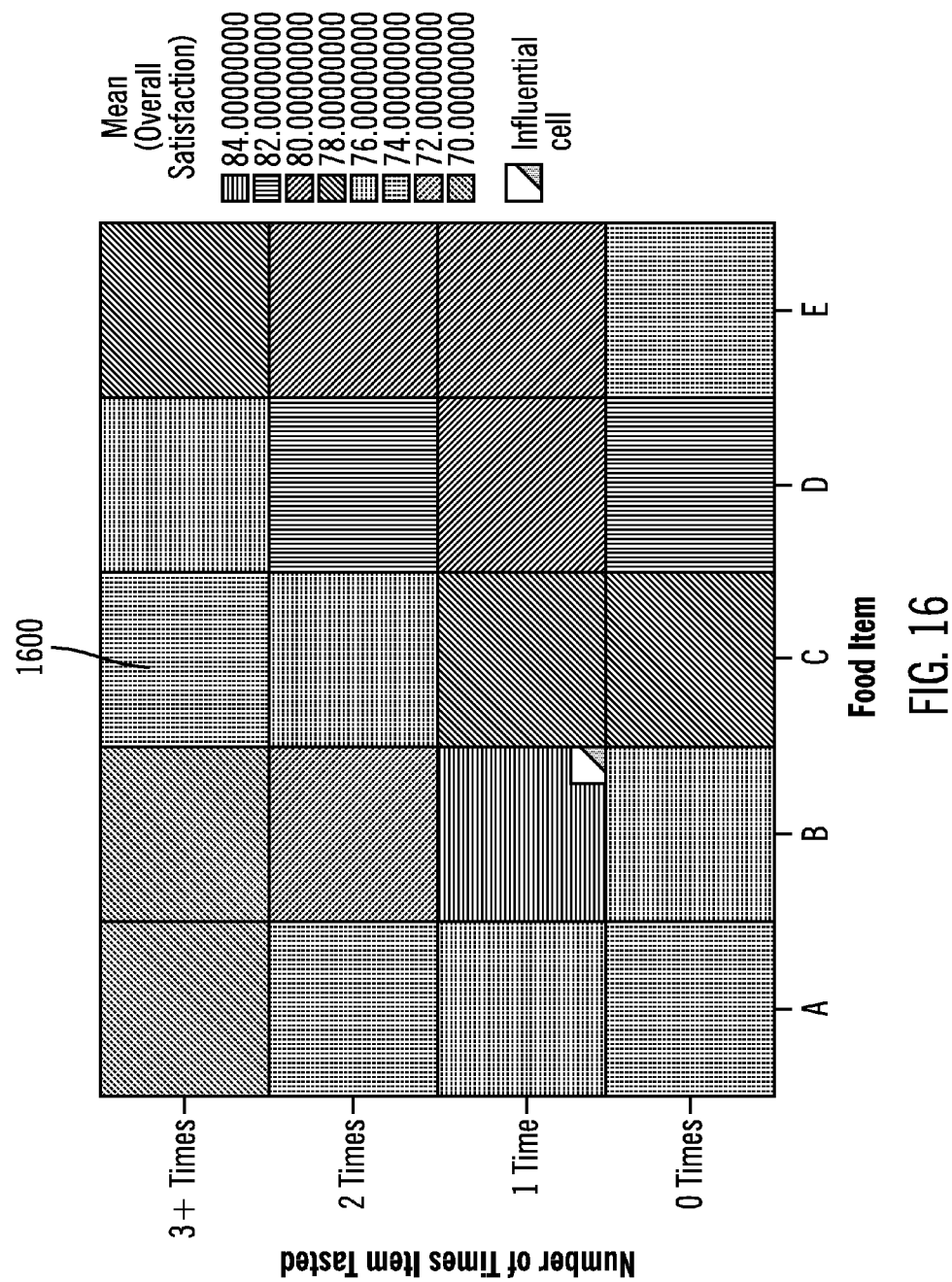
FIG. 16 illustrates a heat map of overall customer satisfaction in accordance with certain embodiments.

FIG. 16 illustrates a heat map 1600 of overall customer satisfaction in accordance with certain embodiments. Food items were evaluated by a sample of customers. Each customer tasted a single item and the customer overall satisfaction score on the scale 1-100 was recorded for the offered item. Also recorded was the number of times each customer had tasted the item on any previous occasion. The interaction effect between the food items and the number of times an item was tasted is weak. The effect size of the interaction is 0.022. Nevertheless, due to fairly large sample of customers, the p-value of the interaction effect is 0.001. The cell for the food item B previously tasted 1 time is influential, and its contribution to the overall interaction effect has a p-value 0.01.

Figure 17A:
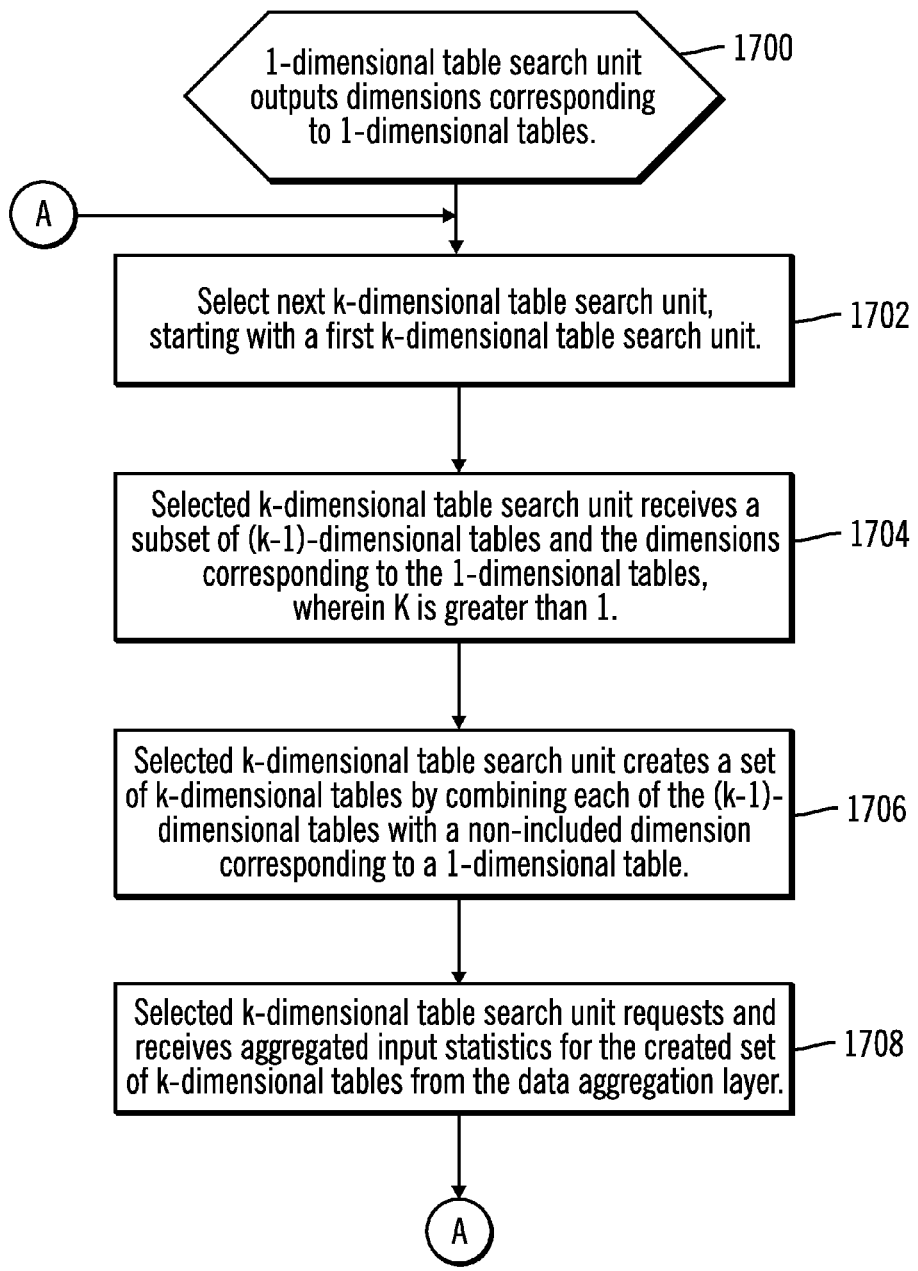
FIG. 17 illustrates operations performed on k-dimensional tables in accordance with certain embodiments.
Figure 17B:
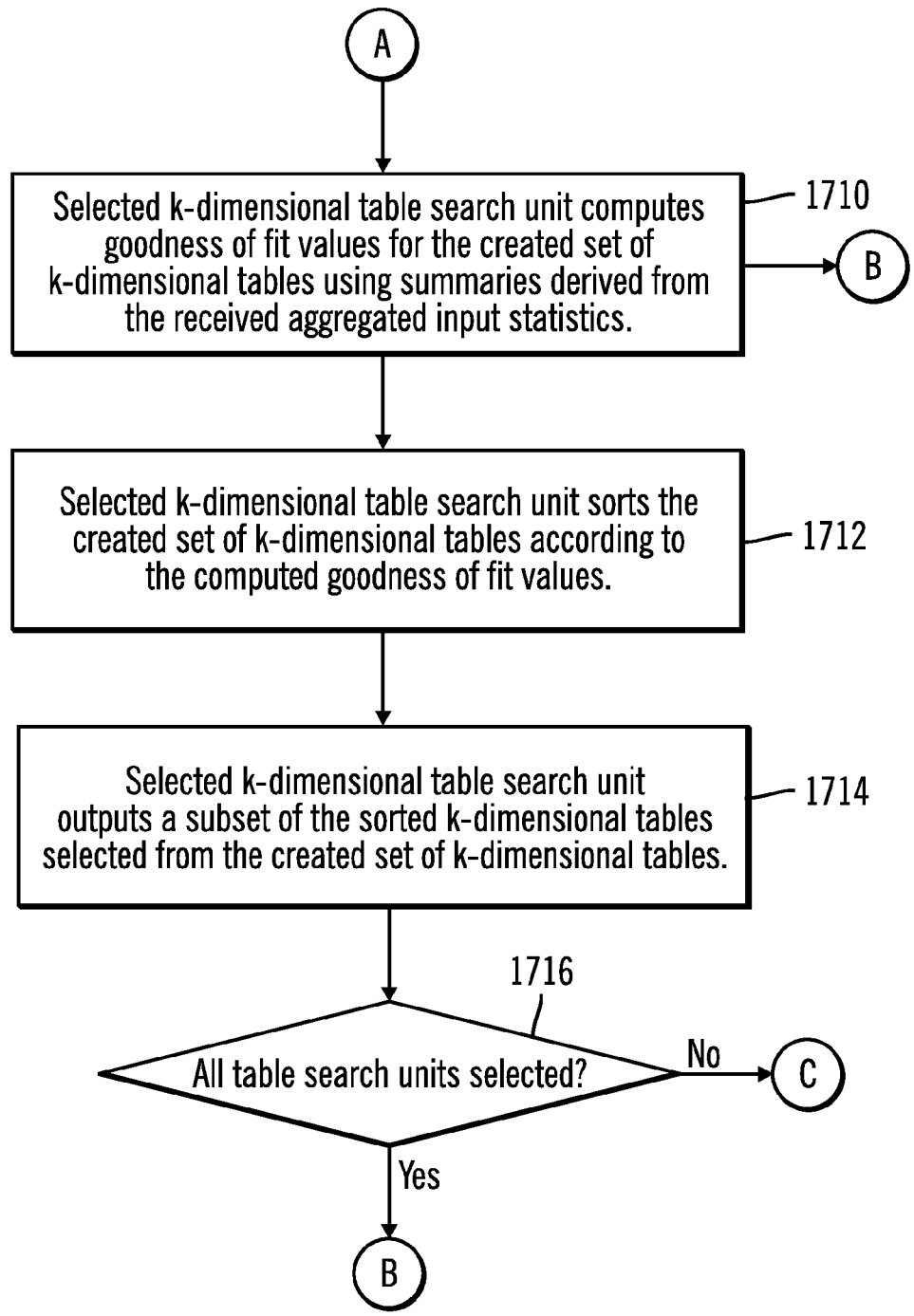
Figure 17C:
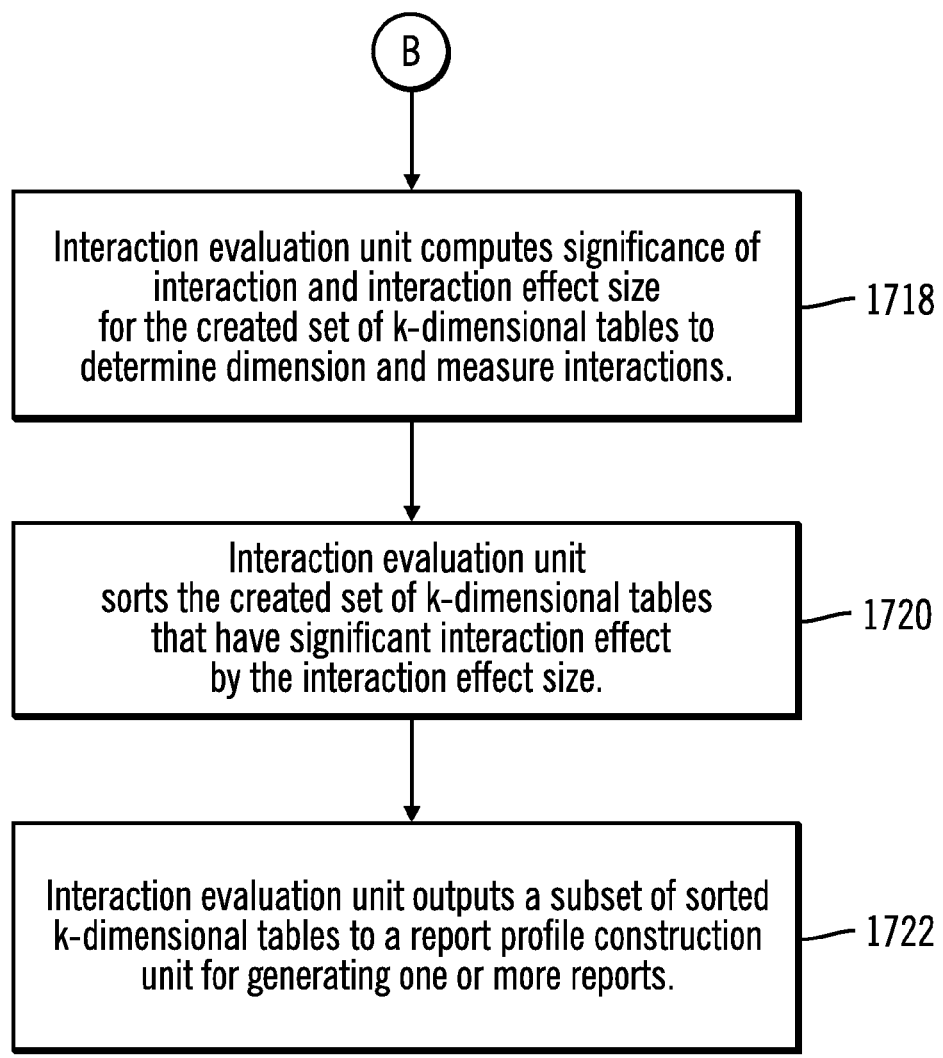

FIG. 17 illustrates operations performed on k-dimensional tables in accordance with certain embodiments. FIG. 17 is formed by FIG. 17A, FIG. 17B, and FIG. 17C. An example will be provided with reference to the operations performed in FIG. 17 merely to enhance understanding of embodiments. For this example, consider the set of following dimensions: A, B, C, D, . . . , X, Y, Z, where each dimension corresponds to a categorical data attribute in a data set.

Control begins at block 1700 with a 1-dimensional table search unit outputting dimensions corresponding to 1-dimensional tables. In certain embodiments, the dimensions are a sorted list of top dimensions, wherein the sorting is in accordance with goodness of fit values.

For the example, let T(1)=5 (i.e., the output of the 1-dimensional search unit contains 5 dimensions sorted by the goodness of fit values (e.g., R-squared values). The following are examples of a sorted list of T(1) single dimensions:

| Dimension | A | B | C | D | E |
|---|---|---|---|---|---|
| R-squared | .57 | .55 | .50 | .48 | .45 |

For this example, the rest of the 1-dimensional tables in the data set all have R-squared values smaller than 0.45.

In block 1702, a next k-dimensional table search unit is selected, starting with a first k-dimensional table search unit. Continuing with the example, assume that k-dimensional search unit is selected with k=4.

In block 1704, the selected k-dimensional table search unit receives a subset of (k−1)-dimensional tables and the dimensions corresponding to the 1-dimensional tables, wherein k is greater than 1. In certain embodiments, the subset of (k−1)-dimensional tables and the dimensions corresponding to the 1-dimensional tables are output from the previous (k−1)-dimensional search unit. In certain embodiments, the subset is a sorted list of top (k−1)-dimensional tables, wherein the sorting is in accordance with goodness of fit values.

Continuing with the example, a 4-dimensional table search unit receives output from a 3-dimensional table search unit. In this example, the output contains two 3-dimensional tables—one 3-dimensional table having dimensions B, D, and E and the other 3-dimensional table having the dimensions A, B, and D. The following provides the R-squared values for these 3-dimensional tables.

| Triples | (B, D, E) | (A, B, D) |
|---|---|---|
| R-squared | .68 | .65 |

The rest of the 3-dimensional tables in the 3-dimensional search unit have R-squared values smaller than 0.65.

In block 1706, the selected k-dimensional table search unit creates a set of k-dimensional tables by combining each of the (k−1)-dimensional tables with non-included dimensions corresponding to 1-dimensional tables.

Continuing with the example, a set of 4-dimensional tables are created by combining the dimension triples with the single dimensions as follows: (A, B, D, E), (B, C, D, E), and (A, B, C, D).

In block 1708, the selected k-dimensional table search unit requests and receives aggregated input statistics for the created set of k-dimensional tables from the data aggregation layer. From block 1708 (FIG. 17A), processing continues to block 1710 (FIG. 17B).

In block 1710, the selected k-dimensional table search unit computes goodness of fit values for the created set of k-dimensional tables using summaries derived from the received aggregated input statistics. From block 1710, processing continues simultaneously to block 1712 and to block 1718 (FIG. 9B).

Continuing with the example, the following are the goodness of fit values for the 4-dimensional tables:

| 4-dimensional tables | (A, B, D, E) | (B, C, D, E) | (A, B, C, D) |
|---|---|---|---|
| R-squared | .71 | .69 | .67 |

In block 1712, the selected k-dimensional table search unit sorts the created set of k-dimensional tables according to the computed goodness of fit values. In block 1714, the selected k-dimensional table search unit outputs a subset of the sorted k-dimensional tables selected from the created set. In certain embodiments, the subset is a sorted list of top (k)-dimensional tables. In block 1716, it is determined whether there all table search units have been selected. If so, processing continues to block 1718 (FIG. 17C), otherwise, processing loops back to block 1702 (FIG. 17A).

In block 1718, the interaction evaluation unit 532 computes significance of interaction and interaction effect size for the created set of k-dimensional tables to determine dimension and measure interactions. In certain embodiments, the significance of interaction and the interaction effect size are computed for the created set of k-dimensional tables using interaction indices in terms of summaries derived from aggregated input statistics that aggregate measure values.

Continuing with the example, the following are the significance of interaction and interaction effect size for the 4-dimensional tables:

| 4-dimensional tables | (A, B, D, E) | (B, C, D, E) | (A, B, C, D) |
|---|---|---|---|
| Interaction effect significance | .01 | .07 | .02 |
| Interaction effect size | .09 | .04 | .03 |

In block 1720, the interaction evaluation unit 532 sorts the created set of k-dimensional tables that have significant interaction effect by the interaction effect size. Continuing with the example, the following is a list of 4-dimensional tables with significant interaction effect sorted according to the interaction effect size: (A, B, D, E), (A, B, C, D). Note that table (B, C, D, E) is not included in the list because this table (B, C, D, E,) is not significant at the 0.05 threshold value.).

In block 1722, the interaction evaluation unit 532 outputs a subset of sorted k-dimensional tables to a report profile construction unit for generating one or more reports. In certain embodiments, the subset is a sorted list of top k-dimensional tables that have an interaction effect size exceeding a fourth threshold value. In particular, computing significance of interaction in block 1718 refers to determining whether the interaction effect is significant or not. Then, tables that have significant interaction effect are sorted in block 1720.

In certain embodiments, top dimensions are selected according to a stated sorting criterion. There are two indices used for sorting: goodness of fit and the interaction effect size. For all k, top T(k) tables are selected using the goodness of fit. Interaction effect size is computed in the interaction evaluation unit as the final step for selected tables before the report profile construction.

For example, in FIG. 17, operations in blocks 1700, 1704, 1712, 1714 sort by the goodness of fit values and select the top k-dimensional tables from these sorted lists according to the goodness of fit values. Operations in blocks 1720, 1722 sort according to the interaction effect size and select the top k-dimensional tables from these sorted lists according to their interaction effect size.

FIGS. 18A, 18B, and 18C illustrate example 1-dimensional tables 1800, 1810, 1820 in accordance with certain embodiments. Although three example 1-dimensional tables are shown merely to enhance understanding of embodiments, there may be any number of 1-dimensional tables in various embodiments. In FIG. 18A, for the example 1-dimensional table 1800, the following are the dimensions, dimension categories, measure, and aggregated input statistics:

Dimension: Claim Type
Claim Type dimension categories: Wind/Hail, Water damage, Fire/Smoke, Contamination, and Theft/Vandalism
Measure: Cost of claim in thousands
Aggregated input statistics: (Count, Mean, Variance)

In FIG. 18B, for the example 1-dimensional table 1810, the following are the dimensions, dimension categories, measure, and aggregated input statistics:

Dimension: Property Condition
Property Condition dimension categories: Habitable and Unhabitable
Measure: Cost of claim in thousands
Aggregated Input Statistics: (Count, Mean, Variance)

In FIG. 18C, for the example 1-dimensional table 1820, the following are the dimensions, dimension categories, measure, and aggregated input statistics:

Dimension: Property Type
Property Type dimension categories: Commercial and Residential
Measure: Cost of claim in thousands
Aggregated Input Statistics: (Count, Mean, Variance)

FIG. 19 illustrates an example 2-dimensional table 1900 in accordance with certain embodiments. Although one example 2-dimensional table is shown merely to enhance understanding of embodiments, there may be many 2-dimensional tables in various embodiments. The example 2-dimensional table 1900 was created by combining the example 1-dimensional table 1800 with a non-included dimension "Property Condition" corresponding to the 1-dimensional table 1810. For the example 2-dimensional table 1900, the following are the dimensions, dimension categories, measure, and aggregated input statistics:

Dimensions: Claim Type, Property Condition
Claim Type dimension categories: Wind/Hail, Water damage, Fire/Smoke, Contamination, and Theft/Vandalism
Property Condition dimension categories: Habitable and Unhabitable
Measure: Cost of claim in thousands
Aggregated Input Statistics: (Count, Mean, Variance)

FIG. 20 illustrates an example 3-dimensional table 2000 in accordance with certain embodiments. Although one example 3-dimensional table is shown merely to enhance understanding of embodiments, there may be many 3-dimensonal tables in various embodiments. The example 3-dimensional table 2000 was created by combining the example 2-dimensional table 1900 with yet another non-included dimension "Property Type" corresponding to the 1-dimensional table 1820. For the example 3-dimensional table 2000, the following are the dimensions, dimension categories, measure, and aggregated input statistics:

Dimensions: Claim Type, Property Condition, Property Type
Measure: Cost of claim in thousands
Claim Type dimension categories: Wind/Hail, Water damage, Fire/Smoke, Contamination, and Theft/Vandalism
Property Condition dimension categories: Habitable and Unhabitable
Property Type dimension categories: Commercial and Residential
Aggregated Input Statistics: (Count, Mean, Variance)

Thus, given a data set and a measure of interest, the relationship discovery engine 410 provides a scalable search for interactions in the multitude of all possible dimensional aggregate tabular reports based on a subset of dimensions.

The relationship discovery engine 410 enables a guided search among any number of predetermined dimensions. Also, the relationship discovery engine 410 evaluates the overall relevance of different combinations of dimensions that affect the measure values. The relationship discovery engine provides a comprehensive technique for searching for important dimensions and their combinations with respect to a given measure in a data set containing a large number of dimensions.

Thus, in certain embodiments, the relationship discovery engine 410 provides efficient discovery of the strongest interaction effects in large data sets with a large number of dimensions by generating statistical models (ANOVA) for analyzing aggregate tables with two or more dimensions and the target aggregated input statistics; applying model-based goodness-of-fit to select the best candidate tables and generate tables with additional dimensions; and efficiently computing the model-based interaction effect size among the table dimensions with respect to the target measure.

The relationship discovery engine 410 not only covers dimension reduction, but also detects interaction effects based on model-based goodness-of-fit statistics. In certain embodiments, the relationship discovery engine 410 focuses on interaction effects that are based on two or more variables without conditioning on another variable. The relationship discovery engine 410 uses basic statistics to carry analysis on aggregated tables.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package,
partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the flow diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method comprising:
receiving, using a processor of a computer, a subset of (k−1)-dimensional tables, wherein k is greater than 1, wherein the subset of (k−1)-dimensional tables are selected based on goodness of fit values exceeding a first threshold, wherein the goodness of fit values are statistics that evaluate model capability to describe data;
creating a set of k-dimensional tables by combining each of the (k−1)-dimensional tables with a non-included dimension corresponding to a 1-dimensional table;
outputting a subset of the k-dimensional tables selected from the created set of k-dimensional tables for use in creating (k+1)-dimensional tables, wherein the subset of the k-dimensional tables are selected based on goodness of fit values exceeding a second threshold, and wherein the created k-dimensional tables are sorted according to the goodness of fit values; and
computing significance of interaction and interaction effect size for the created set of k-dimensional tables to determine dimension and measure interactions.

2. The method of claim 1, further comprising:
sorting the created set of k-dimensional tables that have significant interaction effect according to the interaction effect size.

3. The method of claim 2, further comprising:
using a subset of the sorted k-dimensional tables that have an interaction effect size exceeding a third threshold to generate one or more reports.

4. The method of claim 1, wherein the significance of interaction and the interaction effect size are computed for the set of created k-dimensional tables using interaction indices in terms of summaries derived from aggregated input statistics that aggregate measure values.

5. The method of claim 1, further comprising:
receiving aggregated input statistics for 1-dimensional tables;
computing the goodness of fit values for each of the 1-dimensional tables; and
sorting the 1-dimensional tables according to the computed goodness of fit values.

6. The method of claim 1, wherein the subset of (k−1)-dimensional tables comprise top (k−1) dimensional tables selected based on the goodness of fit values.

7. The method of claim 1, further comprising:
computing the goodness of fit values using an Analysis of Variance (ANOVA) model.

8. The method of claim 1, wherein a Software as a Service (SaaS) is provided to perform the method.

* * * * *